(12) United States Patent
Yao et al.

(10) Patent No.: US 8,258,221 B2
(45) Date of Patent: Sep. 4, 2012

(54) POLYLACTIC ACID-BASED RESIN COMPOSITION AND MOLDED ARTICLE OF POLYLACTIC ACID-BASED RESIN

(75) Inventors: Kenji Yao, Minamiashigara (JP); Masaya Ikuno, Minamiashigara (JP); Masayuki Okoshi, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 87 days.

(21) Appl. No.: 12/852,866

(22) Filed: Aug. 9, 2010

(65) Prior Publication Data

US 2011/0207865 A1 Aug. 25, 2011

(30) Foreign Application Priority Data

Feb. 25, 2010 (JP) ................. 2010-041079

(51) Int. Cl.
*C08L 67/04* (2006.01)
*C08K 5/19* (2006.01)

(52) U.S. Cl. ........ 524/320; 524/115; 524/124; 524/125; 524/284; 524/599

(58) Field of Classification Search .................. 524/284, 524/115, 124, 125, 320, 599
See application file for complete search history.

(56) References Cited

U.S. PATENT DOCUMENTS

| | | | |
|---|---|---|---|
| 2,758,987 A | 8/1956 | Salzberg et al. | |
| 4,057,537 A | 11/1977 | Sinclair | |
| 5,281,643 A * | 1/1994 | Natarajan | 524/236 |
| 5,310,865 A | 5/1994 | Enomoto et al. | |
| 5,428,126 A | 6/1995 | Kashima et al. | |
| 5,637,631 A | 6/1997 | Kitada et al. | |
| 2005/0014871 A1 * | 1/2005 | Chin | 524/99 |
| 2005/0143502 A1 * | 6/2005 | Yamada et al. | 524/115 |
| 2008/0188597 A1 * | 8/2008 | Moriyama et al. | 524/127 |

FOREIGN PATENT DOCUMENTS

EP 0 712 880 A2 5/1996
JP A-2004-27079 1/2004

* cited by examiner

*Primary Examiner* — David W Wu
*Assistant Examiner* — Vu A Nguyen
(74) *Attorney, Agent, or Firm* — Oliff & Berridge, PLC

(57) ABSTRACT

A polylactic acid-based resin composition includes (A) a polylactic acid-based resin; (B) a flame retardant compound; and (C) an ammonium compound of organic acid.

14 Claims, No Drawings

POLYLACTIC ACID-BASED RESIN COMPOSITION AND MOLDED ARTICLE OF POLYLACTIC ACID-BASED RESIN

CROSS REFERENCE TO RELATED APPLICATIONS

This application is based on and claims priority under 35 USC §119 from Japanese Patent Application No. 2010-041079 filed Feb. 25, 2010.

BACKGROUND

1. Technical Field

The present invention relates to a polylactic acid-based resin composition, and a molded article of polylactic acid-based resin.

2. Related Art

In recent years, application of resin moldings made of biomass resins to various uses has been considered from the environmental standpoint. Among the uses, the field of housings of electronic products and the like especially requires the resin moldings to possess flame retardant properties.

SUMMARY

According to an aspect of the present invention, there is provided a polylactic acid-based resin composition including: (A) a polylactic acid-based resin; (B) a flame retardant compound; and (C) an ammonium compound of organic acid.

DETAILED DESCRIPTION

Hereinafter, an exemplary embodiment of the present invention will be described in detail. Note that, the present invention is not to be limited to the exemplary embodiment described below, and may be carried out with various modifications applied thereto within the scope of the invention.

<Polylactic Acid-Based Resin Composition>

(A) Polylactic Acid-Based Resin

Examples of the polylactic acid-based resin as component (A) used in the present exemplary embodiment include: polylactic acids; copolymers of lactic acids and other aliphatic esters; and blends and alloys of polylactic acids and other aliphatic polyesters. When the polylactic acid-based resin is a copolymer, a blend, or an alloy, the amount of lactic acid contained in the polylactic acid-based resin is 50% by weight or more, preferably 60% by weight or more, and more preferably 70% by weight or more.

Among these resins, polylactic acids and copolymers of lactic acids and other aliphatic ester are preferable, and polylactic acids are more preferable. Polylactic acids are not particularly limited as long as being a polymer including repeated units of lactic acid, and publicly-known polylactic acids are adoptable. In addition, the lactic acid component of the polylactic acid may include L-lactic acid or D-lactic acid, or both of them. From the viewpoint of flexibility, it is preferable that the content of L-lactic acid be 80% by mass or more, or the content of D-lactic acid be 80% by mass or more, in the lactic acid component of the polylactic acid. Further, the polylactic acid may include other copolymer components in addition to lactic acid as long as the effects of the present invention are not impaired. Examples of other copolymer components include: hydroxybutyric acids; hydroxyvaleric acids, and citric acids.

A method of manufacturing polylactic acids and copolymers of lactic acids and other aliphatic esters may be any one of publicly-known manufacturing methods, and is not particularly limited. The following methods may be adopted, for example: (1) a method of subjecting lactic acid or a mixture of lactic acid and aliphatic hydroxycarboxylic acid, as a raw material, to direct dehydration polycondensation (for example, U.S. Pat. No. 5,310,865); (2) an ring-opening polymerization method of subjecting a circular dimer of lactic acid (lactide) to melt polymerization (for example, U.S. Pat. No. 2,758,987); (3) an ring-opening polymerization method of subjecting a circular dimer of lactic acid or aliphatic hydroxycarboxylic acid, such as a lactide and glycolide, and s-caprolactone to melt polymerization under the presence of a catalyst (for example, U.S. Pat. No. 4,057,537); (4) a method of subjecting a mixture of lactic acid, aliphatic divalent alcohol, and aliphatic dibasic acid to direct dehydration polycondensation (for example, U.S. Pat. No. 5,428,126); (5) a method of subjecting polylactic acid and polymer of aliphatic divalent alcohol and aliphatic dibasic acid to condensation under the presence of an organic solvent (for example, EP 0712880/A2); and (6) a method of performing solid-phase polymerization in at least one part of processes when lactic acid is applied to dehydration polycondensation under the presence of a catalyst to manufacture a polyester polymer.

The polylactic acid-based resin used in the present exemplary embodiment may be a blend or an alloy of polylactic acid and aliphatic polyester if needed. Examples of the aliphatic polyester include polymers obtainable from various combination of: aliphatic hydroxycarboxylic acids exclusive of lactic acid; aliphatic divalent alcohols; and aliphatic dibasic acids. A method of manufacturing the aliphatic polyester is not particularly limited, and a method similar to the methods of manufacturing polylactic acids and copolymers of lactic acids and aliphatic esters, for example, may be employed.

Specific examples of aliphatic hydroxycarboxylic acids exclusive of lactic acid includes: glycolic acid; 3-hydroxybutyric acid; 4-hydroxybutyric acid; 3-hydroxyvaleric acid; 4-hydroxyvaleric acid; 6-hydroxycaproic acid; and the like. Further, the examples include: a dimer of glycolic acid, such as glycolide, cyclic esters of aliphatic hydroxycarboxylic acids, such as ε-caprolactone, which is a cyclic ester of 6-hydroxycaproic acid. These may be used alone or in combination of two or more.

Examples of the aliphatic divalent alcohols include: ethylene glycol; diethylene glycol; triethylene glycol; polyethylene glycol; propylene glycol; dipropylene glycol; 1,3-butanediol; 1,4-butanediol; 3-methyl-1,5-pentanediol; 1,6-hexanediol; 1,9-nonanediol; neopentyl glycol; polytetramethylene glycol; 1,4-cyclohexanedimethanol; and the like. These alcohols may be used alone or in combination of two or more.

Specific examples of the aliphatic dibasic acids include: succinic acid; oxalic acid; malonic acid; glutaric acid; adipic acid; pimelic acid; suberic acid; azelaic acid; sebacic acid; undecanedioic acid; dodecanedioic acid; and the like. These acids may be used alone or in combination of two or more.

The average molecular weight of the polylactic acid-based resin used in the present exemplary embodiment, as weight-average molecular weight, is generally 10,000 or more, preferably 20,000 or more, and 200,000 or less, preferably 150,000 or less. When the average molecular weight of the polylactic acid-based resin is excessively small, formation of networks by cross linking tends to be insufficient. On the other hand, when the average molecular weight of the polylactic acid-based resin is excessively large, cross-linking reactivity tends to be lowered.

In the present exemplary embodiment, a polylactic acid-based resin containing a crystallization promoting agent may be used. Examples of the crystallization promoting agent include: inorganic fillers, such as talc and glass fibers; mica; trimesic acid tricyclohexylamide; trimesic acid tris(2-methylcyclohexylamide); trimesic acid tris(2,3-dimethylcyclohexyl amide); and the like. The amount of the crystallization promoting agent to be added is generally in a range from 0.1 parts by weight to 30 parts by weight to 100 parts by weight of the polylactic acid-based resin.

(B) Flame Retardant Compound

A flame retardant compound to be used as component (B) in the present exemplary embodiment may be a publicly-known additive, and is not particularly limited. Examples of the flame retardant compounds include: phosphorus-based flame retardant compounds; boric acid-based flame retardant compounds; inorganic flame retardant compounds; nitrogen-based flame retardant compounds; halogen-based flame retardant compounds; organic flame retardant compounds; and colloidal flame retardant compounds, and the like. These flame retardant compounds may be used alone or in combination of two or more.

Examples of the phosphorus-based flame retardant compounds include: ammonium phosphate; ammonium polyphosphates; aluminum polyphosphates; melamine polyphosphates; melamine pyrroline acid; red phosphorus; phosphate esters; tris(chloroethyl)phosphate; tris(monochloropropyl)phosphate; tris(dichloropropyl)phosphate; triallyl phosphate; tris(3-hydroxypropyl)phosphate; tris(tribromophenyl)phosphate; tris-β-chloropropyl phosphate; tris(dibromophenyl)phosphate; tris(tribromoneopentyl)phosphate; tetrakis(2-chloroethyl)ethylene diphosphate; dimethyl methylphosphate; tris(2-chloroethyl)orthophosphate esters; aromatic condensed phosphate esters; halogen-containing condensed organic phosphate esters; ethylene-bis-tris(2-cyanoethyl)phosphonium bromide; β-chloroethyl acid phosphate; butyl pyrophosphate; butyl acid phosphate; butoxyethyl acid phosphate; 2-ethylhexyl acid phosphate; melamine phosphate salts; halogen-containing phosphonates; phenyl phosphonates; and the like.

Examples of the boric acid-based flame retardant compounds include compounds containing boric acid, such as zinc borate hydrates, barium metaborate, and borax, and the like.

Examples of the inorganic flame retardant compounds include: metal sulfate compounds, such as zinc sulfate, potassium hydrogen sulfate, aluminum sulfate, antimony sulfate, sulfate esters, potassium sulfate, cobalt sulfate, sodium hydrogen sulfate, iron sulfate, copper sulfate, sodium sulfate, nickel sulfate, barium sulfate, and magnesium sulfate; ammonium-based flame retardant compounds, such as ammonium sulfate; iron oxide flame retardant catalysts, such as ferrocene; metal nitrate compounds, such as copper nitrate; titanium-containing compounds, such as titanium oxide; guanidine compounds, such as guanidine sulfamate; carbonate compounds, such as potassium carbonate; metal hydroxides, such as aluminum hydroxide and magnesium hydroxide; zirconium-based compounds; molybdenum-based compounds; tin-based compounds; montmorillonite; and the like.

Examples of the nitrogen-based flame retardant compounds include cyanurate compounds containing a triazine ring and the like.

Examples of the halogen-based flame retardant compounds include: chlorinated paraffin; perchlorocyclopentadecane; hexabromo benzene; decabromodiphenyl oxide; bis(tribromophenoxy)ethane, ethylene bis-dibromo norbornane dicarboxyimide; ethylene bis-tetrabromo phthalimide; dibromoethyl-dibromocyclohexane; dibromoneopentyl glycol; 2,4,6-tribromophenol; tribromophenyl allyl ether; tetrabromo-bisphenol A derivatives; tetrabromo-bisphenol S derivatives; tetradecabromo-diphenoxybenzene; tris-(2,3-dibromopropyl)-isocyanurate, 2,2-bis(4-hydroxy-3,5-dibromophenyl)propane; 2,2-bis(4-hydroxyethoxy-3,5-dibromophenyl)propane; poly(pentabromobenzyl acrylate); tribromostyrene; tribromophenyl maleimide; tribromoneopentyl alcohol; tetrabromo dipentaerythritol; pentabromobenzyl acrylate; pentabromophenol; pentabromotoluene; pentabromodiphenyl oxide; hexabromocyclododecane; hexabromodiphenyl ethers; octabromophenol ethers; octadibromodiphenyl ethers; octabromodiphenyl oxide; magnesium hydroxide; dibromoneopentyl glycol tetracarbonate; bis(tribromophenyl)fumaramide; N-methylhexabromodiphenylamine; styrene bromide; diallyl chlorendate; and the like.

Examples of the organic flame retardant compounds include silica-based compounds, such as silicone oil, silicon dioxide, low-melting glass, and organosiloxane; bisphenol A-containing compounds; glycidyl compounds, such as glycidyl ethers; polyhydric alcohols, such as diethylene glycol and pentaerythritol; modified carbamide; chlorendic anhydride; phthalic anhydride; and the like.

Examples of the colloidal flame retardant compounds include: hydroxides, such as aluminum hydroxide, magnesium hydroxide, and calcium hydroxide; hydrates, such as calcium aluminate, gypsum dihydrate, zinc borate, barium metaborate, borax, and kaolin clay; nitrates, such as sodium nitrate; molybdenum-containing compounds; zirconium-containing compounds; antimony-containing compounds; colloid of dawsonite, phlogopite, and the like; and the like.

Among these flame retardant compounds, the phosphorus-based flame-retardant compounds are preferable. Among the phosphorus-based flame-retardant compounds, ammonium polyphosphates, aluminum polyphosphates, melamine polyphosphates, and aromatic condensed phosphate esters are preferable, and ammonium polyphosphates are especially preferable.

In the present exemplary embodiment, the amount of the flame retardant compound as the component (B) to be added to the polylactic acid-based resin as the component (A) is not particularly limited. In general, 5 parts by weight or more of the flame retardant compound as the component (B) are added to 100 parts by weight of the polylactic acid-based resin as the component (A). Further, the amount of the component (B) to be added is preferably 10 parts by weight or more, and more preferably 15 parts by weight or more. Note that, the amount of the component (B) to be added is generally 40 parts by weight or less, preferably 30 parts by weight or less, and more preferably 25 parts by weight or less. When the amount of the component (B) to be added is excessively small, the flame retardant properties tend to be poorer. On the other hand, when the amount of the component (B) is excessively large, the long-term sustainability of the flame retardant properties tends to be decreased.

(C) Ammonium Compound of Organic Acid

Examples of the ammonium compound of organic acid used as component (C) in the present exemplary embodiment include: ammonium hydroxycarboxylate compounds; ammonium aliphatic carboxylate compounds; ammonium aromatic carboxylate compounds; and the like.

Examples of the ammonium hydroxycarboxylate compounds include: ammonium lactate; ammonium citrate; ammonium 3-hydroxypropionate; ammonium 3-hydroxy-2-methyl propionate; ammonium 3-hydroxybutyrate, ammonium 3-hydroxy-2-methyl butanoate; ammonium 3-hydroxy- 2-methyl pentanoate; ammonium 3-hydroxy-3-methyl butanoate; ammonium 2,3-dimethyl-3-hydroxybutanoate; ammonium 3-hydroxy-3-phenylpropionate; and the like.

Examples of the ammonium aliphatic carboxylate compounds include: ammonium formate; ammonium acetate; ammonium propionate; ammonium butyrate; ammonium valerate; ammonium heptanoate; ammonium laurate; ammonium palmitate; ammonium stearate; ammonium acrylate; ammonium crotonate; ammonium methacrylate; ammonium oxalate; ammonium malonate; ammonium malate; ammonium fumarate; ammonium succinate; ammonium adipate; ammonium azelate; ammonium sebacate; ammonium citrate tribasic; ammonium citrate dibasic, ammonium carbamate; and the like.

Examples of the ammonium aromatic carboxylate compounds include ammonium benzoate; ammonium toluate; ammonium phthalate; ammonium trimellitate; ammonium pyromellitate; and the like.

For the ammonium compound of organic acid (C) to be used in the present exemplary embodiment, ammonium hydroxycarboxylate compounds are preferable. Among these compounds, ammonium lactate is especially preferable.

In the present exemplary embodiment, an ammonium compound of inorganic acid may be added together with the ammonium compound of organic acid (C) described above. Examples of the ammonium compounds of inorganic acid include ammonium salts, such as ammonium salts of oxo acid, ammonium salts of hydracids, and ammonium salts of peroxoacid. Specifically, examples include: ammonium borate; ammonium carbonate; ammonium bicarbonate; ammonium phosphate; ammonium phosphite; ammonium hypophosphite; ammonium tripolyphosphates; ammonium sulfite; ammonium sulfate; ammonium chlorate; ammonium hypochlorite; ammonium perchlorate; ammonium iodate; ammonium peroxophosphate; ammonium peroxodiphosphate; ammonium peroxosulfate; ammonium peroxodisulfate; ammonium sulfamate; and the like.

In the present exemplary embodiment, the amount of the ammonium compound of organic acid (C) to be added to the polylactic acid-based resin (A) is not particularly limited; in general, 0.2 parts by weight or more of the ammonium compound of organic acid (C) is added to 100 parts by weight of the polylactic acid-based resin (A). Further, the amount of the component (C) to be added is preferably 0.5 parts by weight or more, and further preferably 1 part by weight or more. Note that, the amount of the component (C) to be added is generally 50 parts by weight or less, preferably 20 parts by weight or less, and more preferably 15 parts by weight or less. When the amount of the component (C) to be added is excessively small, the flame retardant properties tend to be poorer. On the other hand, when the amount of the component (C) to be added is excessively large, the long-term sustainability of the flame retardant properties tends to be decreased.

<Hydrolysis Inhibitor>

A hydrolysis inhibitor may be added as component (D) further to the polylactic acid-based resin composition to which the present exemplary embodiment is applied. Addition of the hydrolysis inhibitor (D) results in inhibition of hydrolysis of the polylactic acid-based resin without affecting the flame retardant properties of a molded article obtained from the resin composition, and further brings about the likelihood that lowering of the flexibility of the molded article is prevented.

The hydrolysis inhibitor (D) may be any of publicly-known compounds, for example, which are known as additives for inhibiting hydrolysis of polymer compounds including a carboxyl group (—COOH), a hydroxyl group (—OH), and the like, and is not particularly limited. Examples of such compounds include carbodiimide compounds and oxazoline compounds.

Examples of the carbodiimide compounds include: dicyclohexylcarbodiimide; diisopropylcarbodiimide; dimethylcarbodiimide; diisobutylcarbodiimide; dioctylcarbodiimide; diphenylcarbodiimide; naphthyl carbodiimide; and the like.

Examples of the oxazoline compounds include 2,2'-o-phenylene-bis(2-oxazoline); 2,2'-m-phenylene-bis(2-oxazoline); 2,2'-p-phenylene-bis(2-oxazoline); 2,2'-p-phenylene-bis(4-methyl-2-oxazoline); 2,2'-m-phenylene-bis(4-methyl-2-oxazoline); 2,2'-p-phenylene-bis(4,4'-dimethyl-2-oxazoline); 2,2'-m-phenylene-bis(4,4'-dimethyl-2-oxazoline); 2,2'-ethylene-bis(2-oxazoline); 2,2'-tetramethylene-bis(2-oxazoline); 2,2'-hexamethylene-bis(2-oxazoline); 2,2'-octamethylene-bis(2-oxazoline); 2,2'-ethylene-bis(4-methyl-2-oxazoline); 2,2'-diphenylene-bis(2-oxazoline); and the like. These hydrolysis inhibitors may be used alone or in combination of two or more.

The amount of the hydrolysis inhibitor (D) to be added is not particularly limited; in the present exemplary embodiment, 5 parts by weight or less of the hydrolysis inhibitor (D) is generally added to 100 parts by weight of the polylactic acid-based resin, and 2 parts by weight or less to be added is preferable. When the amount of the hydrolysis inhibitor (D) to be added to the polylactic acid-based resin is excessively large, moldability tends to be decreased due to gelation.

<Other Additives>

Other publicly-known additives may be contained in the polylactic acid-based resin composition to which the present exemplary embodiment is applied. Examples of such publicly-known other additives include: reinforcing materials; inorganic fillers; organic fillers; antioxidants; heat stabilizers; ultraviolet absorbers; lubricants; waxes; colorants; and the like. These additives may be used alone or in combination of two or more.

Examples of the reinforcing materials include: glass micro-beads; carbon fibers; chalk; quartz; asbestos; feldspar; isinglass; talc; wollastonite; kaolin; and the like. Examples of the inorganic fillers, in addition to carbon black and silicon dioxide, include: alumina; silica; magnesia; ferrite; barium sulfate; calcium carbonate; fullerene; and the like. Examples of the organic fillers include: epoxy resins; melamine resins; urea resins; acrylic resins; phenolic resins; polyimide resins; polyamide resins; polyester resins; fluorine resins; and the like. These may be used alone or in combination of two or more.

Examples of the antioxidants include: phenolic-containing antioxidants; amine-containing antioxidants; phosphorus-containing antioxidants; sulfur-containing antioxidants; hydroquinone-containing antioxidants; quinoline-containing antioxidants; and the like.

Examples of the heat stabilizers include: nitrogen-containing compounds, such as basic nitrogen-containing compounds including polyamide, poly-β-alanine copolymers, polyacrylamide, polyurethane, melamine, cyanoguanidine, melamine-formaldehyde condensation polymers, and the like; alkali metal or alkali earth metal-containing compounds, such as metal salts of organic carboxylic acid (calcium stearate, 12-calcium hydroxystearate, and the like), metal oxides (magnesium oxide, calcium oxide, aluminum oxide, and the like), metal hydroxides (magnesium hydroxide, calcium hydroxide, aluminum hydroxide, and the like), and metal carbonate; zeolite; hydrotalcite; and the like.

Examples of the ultraviolet absorbers include: benzophenone-based absorbers; benzotriazole-based absorbers;

cyanoacrylate-based absorbers; salicylate-based absorbers; anilide oxalate-based absorbers; and the like.

Examples of the lubricants include: petrol-based lubricating oils, such as liquid paraffin; synthetic lubricating oils, such as halogenated hydrocarbon, diester oil, silicon oil, and fluorine silicon; various modified silicon oils (epoxy-modified silicon oil, amino-modified silicon oil, alkyl-modified silicon oil, polyether-modified silicon oil, and the like); silicon-based lubricating materials, such as copolymers of silicon and an organic compound (polyoxyalkylene glycol or the like); silicon copolymers; various fluorine-based surfactants, such as fluoroalkyl compounds; fluorine-based lubricating materials, such as low polymers of trifluoromethylene chloride; waxes, such as paraffin wax and polyethylene wax; higher aliphatic alcohols; higher aliphatic amides; higher aliphatic esters; higher aliphatic salts; molybdenum disulfide; and the like.

Examples of the waxes include: olefin-based waxes, such as polypropylene wax and polyethylene wax; paraffin wax; Fischer-Tropsch wax; microcrystalline waxes; Montan wax; aliphatic amide-based waxes; higher aliphatic alcohol-based waxes; higher aliphatic acid-based waxes; aliphatic ester-based waxes; Carnauba wax; rice waxes; and the like.

Examples of the colorants include: inorganic pigments; organic pigments; dyes; and the like.

<Method of Manufacturing a Polylactic Acid-Based Resin Composition>

An example of a method of manufacturing the polylactic acid-based resin composition to which the present exemplary embodiment is applied is a method of melt kneading a polylactic acid-based resin, a flame retardant compound, and an ammonium compound of organic acid by a publicly-known kneader. Alternatively, a method may be adopted, in which a polylactic acid-based resin and a flame retardant compound are kneaded together in advance as well as a polylactic acid-based resin and an ammonium compound of organic acid, and then the resultant mixtures are melt kneaded together.

Examples of a kneader used for the melt kneading include publicly-known kneaders, such as a Banbury mixer, single-screw extruders, twin-screw extruders, cokneaders, and multi-screw extruders. Among these kneaders, twin-screw extruders and single-screw extruders are preferable.

Specifically, in the melt kneading, a polylactic acid-based resin, a flame retardant compound, an ammonium compound of organic acid, and the like are subjected to melt kneading using an extruder, preferably a twin-screw extruder, for example, at a cylinder setting temperature of 160° C. to 250° C., preferably of approximately 170° C. to 200° C. to extrude a strand. Subsequently, the extruded strand is cut. The polylactic acid-based resin composition is prepared in the form of a master batch of columnar pellets. Alternatively, without taking out the strand from the extruder, the polylactic acid-based resin composition in the shape of round particulate may be prepared by a hot-cut method or an underwater-cut method.

In the above melt kneading, the amount of the flame retardant compound (B) added to the polylactic acid-based resin (A) is generally 5 parts by weight to about 40 parts by weight to about 100 parts by weight of the polylactic acid-based resin (A). Meanwhile, the amount of the ammonium compound of organic acid (C) added to the polylactic acid-based resin (A) is about 0.2 parts by weight to about 50 parts by weight to about 100 parts by weight of the polylactic acid-based resin (A).

<Molded Article of Polylactic Acid-Based Resin>

Using the above-described polylactic acid-based resin composition, a molded article of polylactic acid-based resin (hereinafter, simply referred to as "molded article") is obtainable. The molded article in the present exemplary embodiment is preferably applicable to uses, such as electronic and electric devices, household electric appliances, containers, and automobile interior materials. More specifically, the molded article is applicable to: housings, various parts, and the like of household electric appliances and electronic and electric devices; wrapping films; cases for CD-ROM, DVD, and the like; tableware; food packaging trays; beverage bottles; medicine wrapping materials; and the like. Among these, the molding is especially preferably applicable to parts of electronic and electric devices.

<Method of Manufacturing the Molded Article of Polylactic Acid-Based Resin>

A method of manufacturing a molded article of polylactic acid-based resin to which the present exemplary embodiment is applied may be any publicly-known molding method, and is not particularly limited. Examples of the publicly-known molding method include film molding, extrusion molding, injection molding, and the like. Among these molding methods, injection molding is preferable. Specifically, extrusion molding may be carried out in accordance with a common procedure, for example, by using a publicly-known extrusion molding machine, such as a single-screw extruder, a multi-screw extruder, and a tandem extruder. Meanwhile, injection molding may be carried out in accordance with a common procedure, for example, by using a publicly-known injection molding machine, such as an inline-screw injection molding machine, a multi-layer injection molding machine, and a double-cylinder injection molding machine.

In the present exemplary embodiment, it is preferable that injection molding using a mold be carried out at the condition of the cylinder temperature of the injection molding machine at 160° C. to 220° C. Meanwhile, the temperature of the mold used in the injection molding is preferably in a range from 30° C. to 150° C.

A molded article to which the present exemplary embodiment is applied has improved flame retardant properties compared to those in the case where no ammonium compound of organic acid is added. Originally, when a flame retardant compound, such as ammonium polyphosphate, is added to a polylactic acid-based resin, the effect of the flame retardant properties is not sufficient. For example, in the UL-standard Test for Flammability, a specimen having a thickness of 1.6 mm is capable of acquiring V-0 while a specimen having a thickness of 0.8 mm is not capable of acquiring V-0, when the amount of the flame retardant compound to be added is increased.

The reason why the above-described molded article acquires improved flame retardant properties compared to those added with no ammonium compound of organic acid is not clear; however, the following explanation seems plausible.

Specifically, having a relatively low decomposition temperature, a flame retardant compound, such as ammonium polyphosphate, is likely to be decomposed before formation of char (char layer), although having excellent extinction effect. In this respect, the presence of ammonium lactate or the like having a relatively high decomposition temperature improves the effect of char formation. Therefore, it is assumed that the flame retardant properties are improved.

In the meantime, the flame retardant compound, such as ammonium polyphosphate, added to the polylactic acid-based resin exudes (bleeds) from the surface of the molded article after left for an extended period of time. Accordingly, the flame retardant properties of the molded article tend to be reduced. In this respect, the presence of ammonium lactate or the like in the molded article prevents water-soluble ammonium polyphosphate from dissolving into water. Therefore, it is assumed that the bleed of the ammonium polyphosphate is prevented.

Further, in the present exemplary embodiment, the ammonium compound of organic acid, such as ammonium lactate, added to the composition is considered to possess a compatibilizer-like function working between the polylactic acid-based resin and the flame retardant compound, such as ammonium polyphosphate. Accordingly, dispersiveness of the flame retardant compound in the composition is improved. Therefore, it is assumed that the flame retardant properties are improved using about the same amount of the flame retardant compound added, in comparison with the case where no ammonium compound of organic acid is added.

EXAMPLES

Hereinafter, the present invention will be further described in detail by Examples. It should be noted, however, that the present invention is not limited to the Examples described below.

Examples 1 to 14, Comparative Examples 1 to 5

Pellets of polylactic acid-based resin compositions (Examples 1 to 14) are prepared by kneading together: a polylactic acid-based resin; ammonium lactate as the ammonium compound of organic acid; ammonium polyphosphate as the flame retardant compound; and carbodiimide as the hydrolysis inhibitor, using a twin-screw kneader (TEM58SS available from Toshiba Machine Co., Ltd.). The compositions of the polylactic acid-based resin compositions and the cylinder temperature conditions for the kneading are shown in Tables 1 and 2. In the meantime, for comparison, pellets of resin compositions containing no ammonium lactate (Comparative Examples 1 to 5) are prepared. The compositions of the resin compositions and the cylinder temperature conditions for the kneading are shown in Table 2. Here, the unit of the amount of each of the components of the compositions is "parts by weight."

Next, ISO multipurpose dumbbell specimens (each having a thickness of 4 mm and a width of 10 mm, and applicable to ISO 527: Determination of Tensile Properties, and ISO 178: Determination of Flexural Properties) are formed from the above-described pellets of the polylactic acid-based resin compositions, and the molded article of polylactic acid-based resin thus obtained are subjected to a test for flammability (Examples 1 to 14) as described below. Further, in a similar manner, specimens are formed with the resin compositions of Comparative Examples 1 to 5, and the molded article of resin thus obtained are subjected to the test for flammability. Results are shown in Tables 1 and 2.

(1) Test for Flammability of Molded Article of Polylactic Acid-Based Resin

UL-standard compliant specimens of two different thicknesses (0.8 mm and 1.6 mm) are prepared from each of the polylactic acid-based resin compositions by injection molding using an injection molding machine (NEX50 available from Nissei Plastic Industrial Co., Ltd.) at the cylinder temperatures shown in Tables 1 and 2 and the condition of molding cycle of 1 minute. The specimens thus obtained are subjected to UL-standard 94: 20 mm Vertical Burning Test. In the UL class, "V0" means V-0 rated, "V1" means V-1 rated, and "NotV" means not V-0 and V-1 rated.

Here, 5 specimens are used for determination of each of V-0 and V-1 ratings. Specifically, a burner is held so as to bring its flames into contact with the bottom end of a strip specimen held vertically, and is left to stand there for 10 seconds. Then, the burner flames are moved away from the specimen. If the flames on the specimen went off, the burner flames are immediately brought into contact with the specimen again, left to stand there for another 10 seconds, and then moved away from the specimen.

Determinations of V0 and V1 are carried out based on: time periods of duration of flaming of a specimen after the burner flames are moved away therefrom for the first time and for the second time, respectively; a total time period of duration of flaming and glowing of a specimen after the burner flames are moved away therefrom for the second time; a total time period of duration of flaming of 5 specimens; and presence or absence of a burning drop (drip).

For both of the first and second flame contact, determination is made based on whether or not flaming is terminated within 10 seconds for V-0, and within 30 seconds for V-1. Further, determination is made based on whether or not a total time period of duration of flaming and glowing after the second flame contact is within 30 seconds for V-0, and within 60 seconds for V-1.

Moreover, determination is made based on whether or not a total time period of duration of flaming of 5 specimens is within 50 seconds for V-0, and within 250 seconds for V-1. Note that, it is a prerequisite for all the specimens not to burn out.

(2) Test for Sustainability of Flame Retardant Properties of Molded Article of Polylactic Acid-Based Resin The above-described UL-standard compliant specimens of two different thicknesses (0.8 mm and 1.6 mm) are left to stand under the environment of 55° C. and 85% RH for 1,000 hours, and then subjected to UL-standard 94: 20 mm Vertical Burn Test to measure the sustainability of flame retardant properties of the molded article of polylactic acid-resin.

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Resin composition | Polylactic acid-based resin (*) | TERRAMAC TE-2000 | — | — | — | — | — | — | — | — | 100 | — |
| | | TERRAMAC TE-7000 | 100 | 100 | 100 | 100 | 100 | 100 | 100 | 100 | 100 | 100 |
| | Ammonium lactate | | 0.5 | 50 | 10 | 20 | 10 | 10 | 10 | 10 | 10 | 10 |
| | Ammonium polyphosphate (**) | TERRAJU C60 | — | — | — | — | — | — | — | — | — | 20 |
| | | EXOLIT AP422 | 20 | 20 | 20 | 20 | 5 | 40 | 20 | 20 | 20 | — |
| Hydrolysis inhibitor | Carbodiimide (***) | | — | — | — | — | — | — | 1 | 2 | — | — |

TABLE 1-continued

|  |  |  | Example |  |  |  |  |  |  |  |  |  |
|---|---|---|---|---|---|---|---|---|---|---|---|---|
|  |  |  | 1 | 2 | 3 | 4 | 5 | 6 | 7 | 8 | 9 | 10 |
|  | Kneading condition | Cylinder temperature ° C. | 180 | 170 | 170 | 170 | 170 | 170 | 170 | 180 | 170 | 170 |
| Resin molding | Molding condition | Cylinder temperature ° C. | 180 | 180 | 180 | 180 | 180 | 180 | 180 | 180 | 180 | 180 |
|  |  | Mold temperature ° C. | 110 | 110 | 110 | 110 | 110 | 110 | 110 | 110 | 40 | 110 |
|  | Test for flammability | 0.8 mm-V | V1 | V0 | V0 | V0 | V1 | V0 | V0 | V1 | V0 | V0 |
|  |  | 1.6 mm-V | V0 | V0 | V0 | V0 | V0 | V0 | V0 | V0 | V0 | V0 |
|  | Test for flammability 55° C./85%/1000 hr | 0.8 mm-V | V1 | V1 | V0 | V0 | V1 | V1 | V0 | V0 | V0 | V0 |
|  |  | 1.6 mm-V | V0 | V0 | V0 | V0 | V0 | V0 | V0 | V0 | V0 | V0 |

TABLE 2

|  |  |  | Example |  |  |  | Comparative example |  |  |  |  |
|---|---|---|---|---|---|---|---|---|---|---|---|
|  |  |  | 11 | 12 | 13 | 14 | 1 | 2 | 3 | 4 | 5 |
| Resin composition | Polylactic acid-based resin (*) | TERRAMAC TE-2000 | — | — | — | — | — | — | — | 100 | — |
|  |  | TERRAMAC TE-7000 | 100 | 100 | 100 | 100 | 100 | 100 | 100 | — | 100 |
|  | Ammonium lactate |  | 0.3 | 55 | 10 | 10 | — | — | — | — | — |
|  | Ammonium polyphosphate (**) | TERRAJU C60 | — | — | — | — | 20 | — | — | — | 40 |
|  |  | EXOLIT AP422 | 20 | 20 | 2.5 | 48 | — | 20 | 20 | 20 | — |
|  | Hydrolysis inhibitor | Carbodiimide (***) | — | — | — | — | — | — | 2 | — | — |
| Resin molding | Kneading condition | Cylinder temperature ° C. | 170 | 170 | 180 | 170 | 170 | 170 | 180 | 170 | 170 |
|  | Molding condition | Cylinder temperature ° C. | 180 | 180 | 180 | 180 | 180 | 180 | 180 | 180 | 180 |
|  |  | Mold temperature ° C. | 110 | 110 | 110 | 110 | 110 | 110 | 110 | 40 | 110 |
|  | Test for flammability | 0.8 mm-V | V1 | V0 | V1 | V0 | NotV | NotV | NotV | NotV | NotV |
|  |  | 1.6 mm-V | V1 | V0 | V1 | V0 | NotV | NotV | NotV | NotV | NotV |
|  | Test for flammability 55° C./85%/1000 hr | 0.8 mm-V | V1 | V1 | V1 | V1 | NotV | NotV | NotV | NotV | NotV |
|  |  | 1.6 mm-V | V1 | V1 | V1 | V0 | NotV | NotV | NotV | NotV | NotV |

Here, components of the polylactic acid-based resin compositions shown in Tables 1 and 2 are as follows:

(*) polylactic acid-based resin

TERRAMAC TE-2000: polylactic acid (available from UNITIKA. Ltd.)

TERRAMAC TE-7000: polylactic acid (available from UNITIKA, Ltd.)

(**) ammonium polyphosphate

TERRAJU C60: ammonium polyphosphate (available from Budenheim Ibérica Commercial, S.A.)

EXOLIT AP422: ammonium polyphosphate (available from Clariant Japan K. K.)

(***) Carbodiimide (hydrolysis inhibitor): CARBODILITE LA1 (available from Nisshinbo Chemical Inc.)

Tables 1 and 2 show good results in the Test for Flammability and long-term sustainability of flame retardant properties for the molded article of polylactic acid-based resin obtained from the polylactic acid-based resin compositions containing the polylactic acid-based resin (A), ammonium polyphosphate (B), and ammonium lactate (C) (Examples 1 to 14).

On the other hand, it is shown that good flame retardant properties are not obtained with the molded article of polylactic acid-based resin obtained from the polylactic acid-based resin compositions without addition of ammonium lactate as the component (C), even if a similar amount of the flame retardant compound to that in Examples is added to the compositions (Comparative Examples 1 to 5).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polylactic acid-based resin composition comprising:
(A) a polylactic acid-based resin;
(B) a flame retardant compound; and
(C) an ammonium hydroxycarboxylate compound.

2. The polylactic acid-based resin composition according to claim 1, wherein about 5 parts by weight to about 40 parts by weight of the flame retardant compound as the component (B) is added to about 100 parts by weight of the polylactic acid-based resin as the component (A).

3. The polylactic acid-based resin composition according to claim 1, wherein about 0.5 parts by weight to about 50 parts by weight of the ammonium hydroxycarboxylate compound as the component (C) is added to about 100 parts by weight of the polylactic acid-based resin as the component (A).

4. The polylactic acid-based resin composition according to claim 1, wherein the flame retardant compound as the component (B) is a phosphorus-based flame retardant compound.

5. The polylactic acid-based resin composition according to claim 1, wherein the flame retardant compound as the component (B) includes one compound selected from ammonium polyphosphates, aluminum polyphosphates, melamine polyphosphates and aromatic condensed phosphate esters.

6. The polylactic acid-based resin composition according to claim 1, wherein the flame retardant compound as the component (B) is an ammonium polyphosphate.

7. The polylactic acid-based resin composition according to claim 1, wherein the ammonium hydroxycarboxylate compound as the component (C) is ammonium lactate.

8. A molded article of polylactic acid-based resin comprising:
(A) a polylactic acid-based resin;
(B) a flame retardant compound; and
(C) an ammonium hydroxycarboxylate compound.

9. The molded article of polylactic acid-based resin according to claim 8, wherein about 5 parts by weight to about 40 parts by weight of the flame retardant compound as the component (B) is added to about 100 parts by weight of the polylactic acid-based resin as the component (A).

10. The molded article of polylactic acid-based resin according to claim 8, wherein about 0.5 parts by weight to about 50 parts by weight of the ammonium hydroxycarboxylate compound as the component (C) is added to about 100 parts by weight of the polylactic acid-based resin as the component (A).

11. The molded article of polylactic acid-based resin according to claim 8, wherein the flame retardant compound as the component (B) is a phosphorus-based flame retardant compound.

12. The molded article of polylactic acid-based resin according to claim 8, wherein the flame retardant compound as the component (B) includes one compound selected from ammonium polyphosphates, aluminum polyphosphates, melamine polyphosphates and aromatic condensed phosphate esters.

13. The molded article of polylactic acid-based resin according to claim 8, wherein the flame retardant compound as the component (B) is an ammonium polyphosphate.

14. The molded article of polylactic acid-based resin according to claim 8, wherein the ammonium hydroxycarboxylate compound as the component (C) is ammonium lactate.

\* \* \* \* \*